March 31, 1936.   W. A. BERGSTROM   2,035,859
METHOD OF MAKING SPRING LOCK NUTS
Filed May 27, 1935
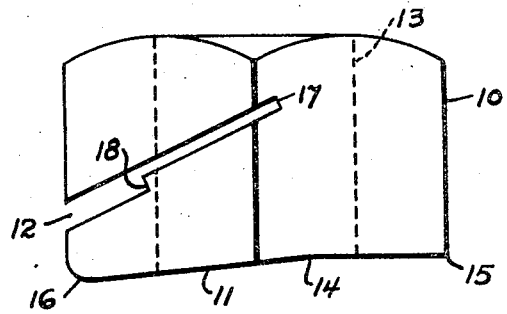
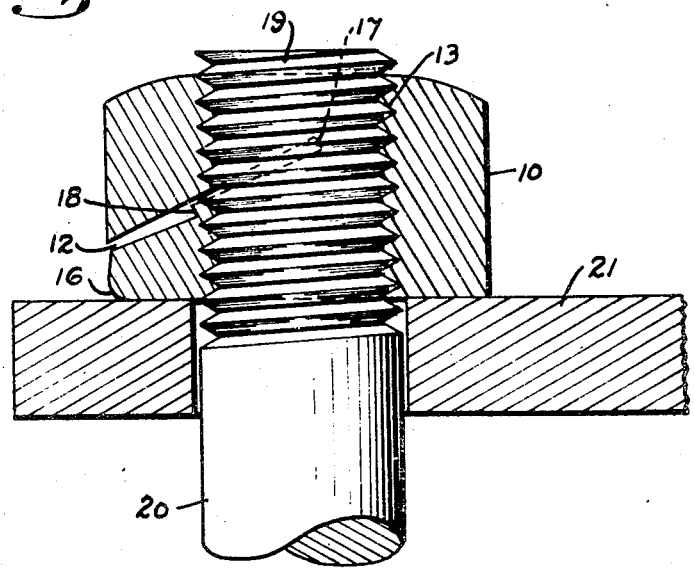
INVENTOR.
William A. Bergstrom.
BY
Chas. E. Townsend.
ATTORNEY.

Patented Mar. 31, 1936

2,035,859

UNITED STATES PATENT OFFICE 2,035,859

METHOD OF MAKING SPRING LOCK NUTS

William A. Bergstrom, Oakland, Calif., assignor to Benchtite Spring Nut Company, San Francisco, Calif., a corporation of California Application May 27, 1935, Serial No. 23,629

REISSUED

2 Claims. (Cl. 10—86)

This invention relates to spring lock nuts, and to the method of making them.

An object of my invention is the provision of nuts which, when applied, are self-locking by their spring action and which may be used a plurality of times without permanent set or deformation taking place therein while they are in functioning position, that is, while under normal strain.

Another object of my invention is to provide a method of making such spring lock nuts.

Other objects of the invention will be apparent on reading the appended specification.

Referring to the drawing which forms a part of this specification,—

Fig. 1 is an elevation of the nut itself; and

Fig. 2 is a sectional view showing the nut in applied position.

The nut 10 follows the usual standards as to its various dimensions for practical purposes, and it may be of any desired shape, that is, square or hexagonal.

It differs from standard nuts as to its base 11 and in being provided with a slot 12. The bore of the nut is indicated at 13, and the base of the nut from the point 14 to the edge 15 lies in a plane at right-angles to the axis of the bore. The base of the nut, however, slopes downwardly from the point 14 to the outer edge 16 which is rounded, so that when the nut is screwed down, the part 16 will contact first for a purpose which will now appear.

On the same side of the nut as the part 16, I provide the stepped slot 12, which enters the nut from the lower part thereof and is directed obliquely upwardly to a point 17 which is past the axis of the nut. The slot may be comparatively narrow at its inner part, and is provided with a shoulder 18 whereby the slot is wider at the outer part of the nut than at the inner.

On Fig. 2, I illustrate the nut 10 applied to the threaded end 19 of a bolt 20 against a work surface or other suitably supported element 21. As the nut is turned down, the part 16 contacts first with the element 21, and as it is turned further, it becomes necessary for the part of the nut which is below the slot to bend upwardly with respect to the rest of the nut, and this is permitted by the slot. As a result, the threads below the slot are given a clamping action when the nut is forced tightly into position.

I make my nuts of a material which is well adapted to the functions and purposes above indicated. This material should be strong and tough, having sufficient resiliency to cause the bending or locking action required, yet not be subject to permanent deformation by being used. It should be of such a character as to be easily milled or cut in order that the slotting operation may be effected at minimum cost, and it should also respond properly to the process of hardening. The material should be such that the threads may be thrown out of alignment by the normal use of the nut, and then returned to exact alignment when the nut is removed from the work so that the nut may be used again. The nut may be made of any suitable material having the above-indicated character, and I have found that steels having a carbon content of about 0.4% to 0.6% are well adapted for this purpose, and that of these the best results are obtained when the carbon content runs about 0.5% to 0.6%.

In the manufacture of the nuts I ordinarily start with flat bars from which the nut-blanks may be made, preferably by hot-forging although other methods, such as cold punching and rolling, are well adapted to the purpose. In making these blanks the base of the nut is given the peculiar shape above described. The slots may be produced by cutting, broaching, milling, or any other suitable method, and this slotting may be performed cold.

After slotting, the blank is tapped, that is, threads are cut interiorally in the bore, and it is important that the slotting operation precede the tapping operation in order to avoid damage to the threads, which may occur if the nut be slotted after the threads are present.

Thereafter the nuts are hardened by heating, drawing and quenching in order to develop the required resiliency or springiness therein; and this must be so great that the slot will re-open to its normal position on removal of the nut from the work, or at least as nearly so as is required to re-align the threads to their normal alignment, even after the slot has been entirely closed by pressure.

When the stel above described is used, the hardening is best to a point within the range of 255 to 302 on the Brinnell scale of hardness, although some variation above or below this range is still useful.

I have referred to various details by way of illustration, but it is to be understood that various changes may be made without departing from the spirit of the invention the scope of which is defined in the appended claims.

Having described my invention, what I claim and desire to secure by Letters Patent is—

1. The method of making a spring nut which consists in first utilizing for this purpose a bar of steel of a strong, tough, free milling nature containing about 0.4% to 0.6% carbon, then hot-forging the bar to the desired shape of the nut and forming the nut blank, then slotting the nut blank and subsequently thereto tapping the nut blank, and finally hardening the nut by a heating, drawing and quenching operation to a degree equivalent to a Brinnell hardness test which lies within a range comprising the range of 255 to 302.

2. The method of making a spring nut which consists in first utilizing for this purpose a bar of steel of a strong, tough, free milling nature containing about 0.5% to 0.6% carbon, then hot-forging the bar to the desired shape of the nut and forming the nut blank, then slotting the nut blank and subsequently thereto tapping the nut blank, and finally hardening the nut by a heating, drawing and quenching operation to a degree equivalent to a Brinnell hardness test of about 255 to 302.

WILLIAM A. BERGSTROM.